(12) United States Patent  
Chen et al.

(10) Patent No.: US 6,650,805 B2  
(45) Date of Patent: Nov. 18, 2003

(54) OPTICAL SWITCH

(75) Inventors: Chien-Cheng Chen, Tu-Chen (TW); Kun-Tsan Wu, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/085,754

(22) Filed: Feb. 27, 2002

(65) Prior Publication Data

US 2003/0113057 A1 Jun. 19, 2003

(51) Int. Cl.[7] .................................................. G02B 6/26
(52) U.S. Cl. ............................. 385/18; 385/16; 385/17; 385/22
(58) Field of Search ............................. 385/18, 16, 17, 385/24, 22, 15, 21

(56) References Cited

U.S. PATENT DOCUMENTS 4,893,891 A * 1/1990 Fujita et al. .................. 385/16
5,420,946 A * 5/1995 Tsai ............................. 385/22
6,275,626 B1 * 8/2001 Laor ............................. 385/18

* cited by examiner

Primary Examiner—Phan T. H. Palmer
(74) Attorney, Agent, or Firm—Wei Te Chung

(57) ABSTRACT

An optical switch includes an input port (51), a plurality of output ports (52), a switching element (40) for switching light signals from the input port to any one of the output ports, a base (30), and a housing (10). The switching element has a driving device (400), a rotary holder (410) and two reflectors (422, 424). The reflectors are attached to a supporting arm (414) of the rotary holder, and positions of two counterweights (418) are adjustable on two balancing arms (416) to balance the combination rotary holder—reflectors around an axis of rotation. The input port is mounted in a center hole (352) of the base and the output ports are mounted in peripheral holes (354) defined in a circle around the center hole. Rotation of the rotary holder switches light signals from the input port to be output to any one of the output ports.

14 Claims, 8 Drawing Sheets

OPTICAL SWITCH

BACKGROUND OF THE INVENTION

1. Field of the Invention

The present invention relates to an optical switch for use in fiber communication and optical network technology, and particularly to an optical switch having a rotating switching mechanism which is balanced for smooth rotation.

2. Description of Related Art

Optical signals are commonly transmitted in optical fibers, which provide efficient light channels through which the optical signals can pass. Recently, optical fibers have been used in various fields, including telecommunications, where light passing through an optic fiber is used to convey either digital or analog information. Efficient switching of optical signals between individual fibers is necessary in most optical processing systems or networks to achieve the desired routing of the signals.

In fiber optic systems, various methods have been previously developed for switching optical signals between fiber cables. In these previously developed methods, one important category is mechanical optical switches.

Mechanical optical switches come in two different designs: in one design, the optical components move, and in the other design the fibers move. Factors for assessing the capability of an optical switch include low insertion loss (<1 dB), good isolation performance (>50 dB) and bandwidth capacity compatible with the fiber network the switch is supporting.

Moving fiber switches involve the actual physical movement of one or more of the fibers to specific positions to accomplish the transmission of a beam of light from one fiber end to another under selected switching conditions. Moving optical component switches, on the other hand, include optical collimating lenses, which expand the beam of light from the fibers, and moving prisms or mirrors, which re-switch the expanded beam as required by the switching process.

The moving fiber switches have a stringent tolerance requirement for the amount and direction of fiber movement. The tolerance is typically a small portion of the fiber core diameter for two fibers to precisely align to reduce loss. The fibers themselves are quite thin and may be subject to breakage if not properly protected. On the other hand, reinforcing the fibers with stiff protective sheaths makes the fibers less flexible, increasing the force required to manipulate each fiber into alignment. Thus these moving fiber optical switches share a common problem of requiring high precision parts to obtain precise positioning control and low insertion loss. This results in high costs and complicated manufacture of the switches. Moreover, frequently moving fibers to and fro is apt to damage or even break the fibers.

The moving optical component switches have less stringent movement control tolerance requirements because of the collimating lenses.

For example, as illustrated in FIG. 7, U.S. Pat. No. 5,420,946 discloses an optical switch which comprises an input port, a plurality of output ports and a switching element for switching signals from the input port to one of the output ports. The input port has an input fiber 112 and a collimator 116. The output ports have output fibers 140 and collimators 160. The switching element comprises a base 130, a reflector 124 having a reflecting surface assembled on the base 130, a hole 132 defined in the base 130 for receiving a shaft, and a plate 134 assembled to the base 130 for blocking the light from an optical interrupter 136 to provide reflector 124 position control. The signals from the input fiber 112 are reflected by the reflector 124 to the different output ports according to the rotation of the reflector 124. However, the positions of the input port, the output ports and the reflector must be precisely aligned with one another. Furthermore, the center of inertia of the base 130 and the reflector 124 is difficult to control because of their shapes. Hence, when the base 130 and the reflector 124 are rotated, eccentricity is induced in the shaft driving the base 130, which may lead to problems with the shaft.

As shown in FIGS. 8 and 9, U.S. Pat. No. 6,275,626 discloses an optical switch which comprises an input port 210 having an input fiber 211 and a collimator 212, a plurality of output ports 250 each having an output fiber 251 and a collimator 252, a mirror assembly 228, a driving means 224 and a counterweight 240 attached to the mirror assembly 228. The plurality of output ports 250 is positioned along the circumference of a circle, the center of which is at the position of the input port 210. The mirror assembly 228 is driven to rotate by the driving means 224. Thus, a light beam 218 from the input port 210 is reflected by three surfaces 282, 284, 286 of the mirror assembly 228 to a single output port 250. The mirror assembly 228 achieves balance while rotating about the Y axis by use of the counterweight 240. However, assuring that the center of inertia of the mirror assembly 228 and the counterweight 240 coincides with the axis of rotation is difficult to achieve because of the shape of the mirror assembly 228, which can result in imbalance. Furthermore, the surfaces 282, 284, 286 are formed by coating a highly refractive material on the mirror assembly 228, which is difficult to replace once damaged.

For the above reasons, an improved optical switch which is easy to align and which has a rotating switching mechanism which is balanced for smooth rotation is desired.

SUMMARY OF THE INVENTION

An object of the present invention is to provide an optical switch with a rotating switching mechanism which is easy to balance around its axis of rotation.

Another object of the present invention is to provide an optical switch which is easy to align.

An optical switch in accordance with the present invention comprises an input port aligning with an input fiber and having a collimator, a plurality of output ports each aligning with an output fiber and having a collimator, a switching element, and a base.

The switching element has a driving device, a rotary holder attached to the driving device and two reflectors attached to the rotary holder. The rotary holder includes a connecting portion, a supporting arm and two balancing arms to which two counterweights are attached, respectively. The positions of the counterweights on the balancing arms can be adjusted to balance the rotary holder and reflector combination around its axis of rotation.

The base comprises a first wall and a second wall, opposite to one another. The second wall defines a center hole for mounting the collimator of the input port and a plurality of peripheral holes for mounting the collimators of the output ports, respectively. The peripheral holes are evenly positioned around the center hole. The switching element is mounted on the first wall of the base.

The light signals from the input port can be switched to any one of the output ports by rotating the rotary holder and reflector combination driven by the driving device.

The rotary holder and reflector combination is easy to balance about a central axis of the connecting portion by adjusting the positions of the counterweights on the two balancing arms after the two reflectors have been mounted in the rotary holder. Moreover, the reflectors are easily replaced with different mirrors because the positions of the counterweights on the two balancing arms can be adjusted.

Other objects, advantages and novel features of the invention will become more apparent from the following detailed description when taken in conjunction with the accompanying drawings.

DETAILED DESCRIPTION OF THE INVENTION

Figure 1:
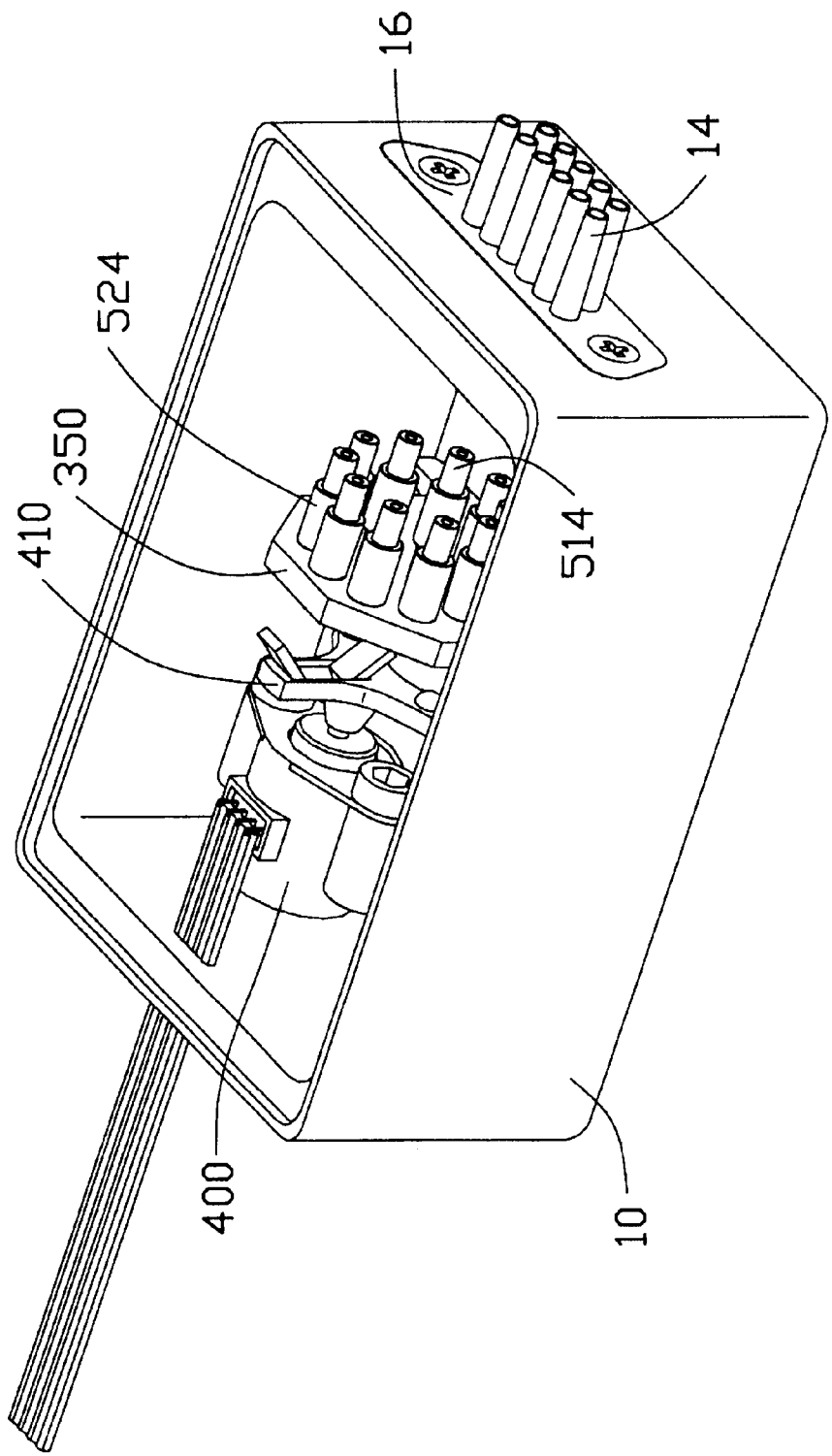
FIG. 1 is a perspective view of an optical switch according to the present invention without a cover.
Figure 2:
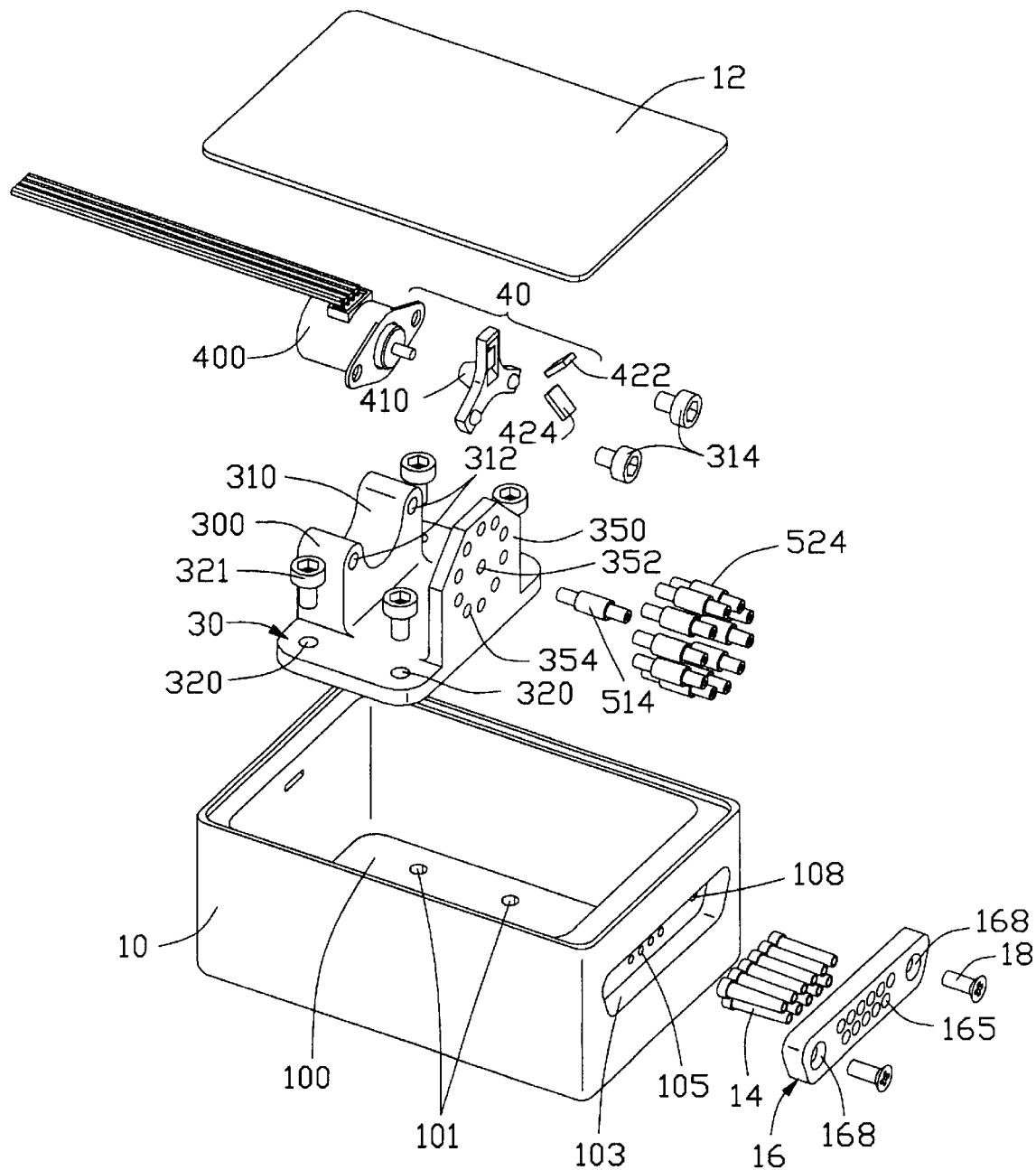
FIG. 2 is an exploded view of the optical switch of FIG. 1, with the cover.
Figure 5:
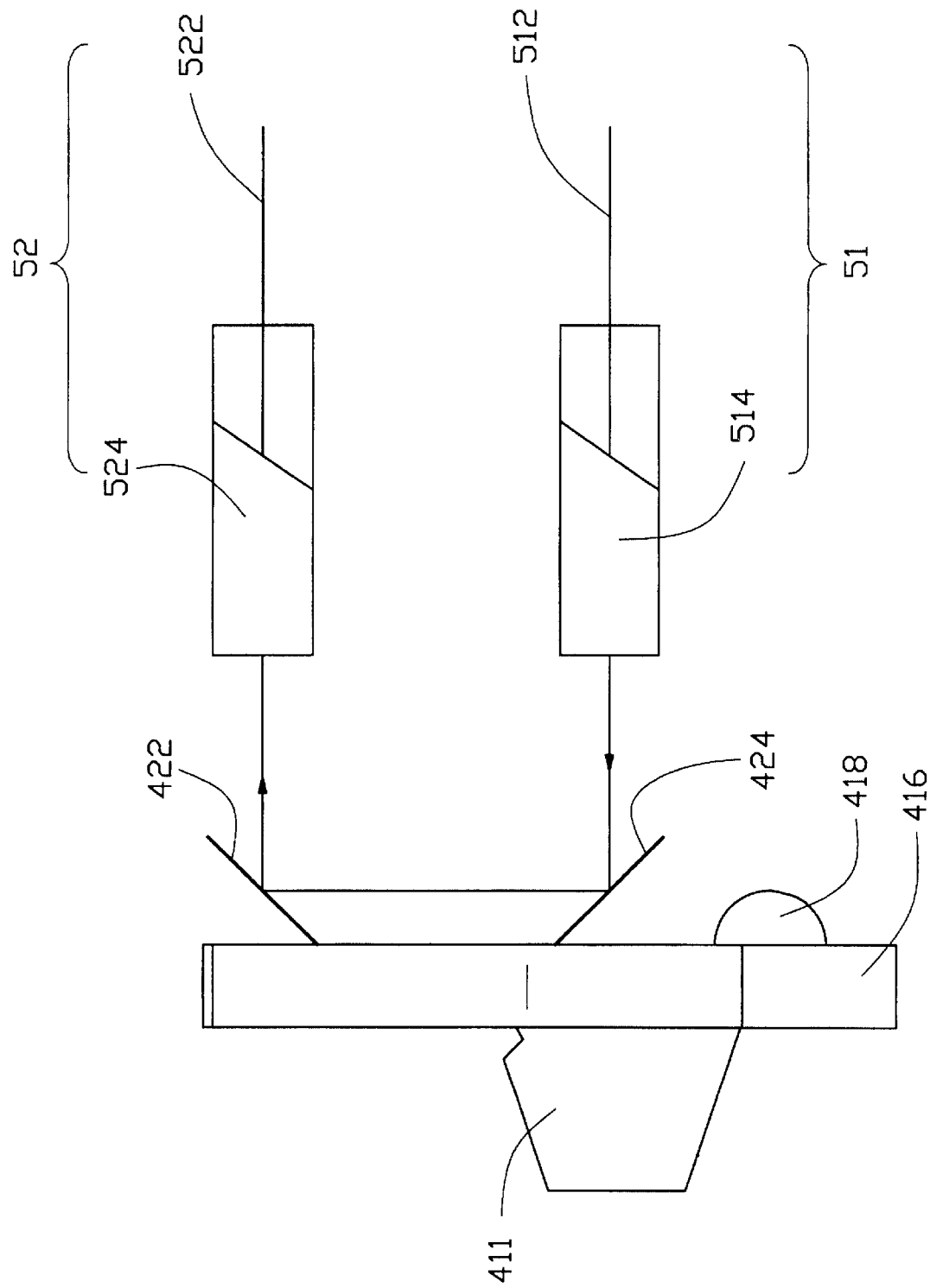
FIG. 5 is an essential optical paths diagram of the optical switch.
Figure 6:
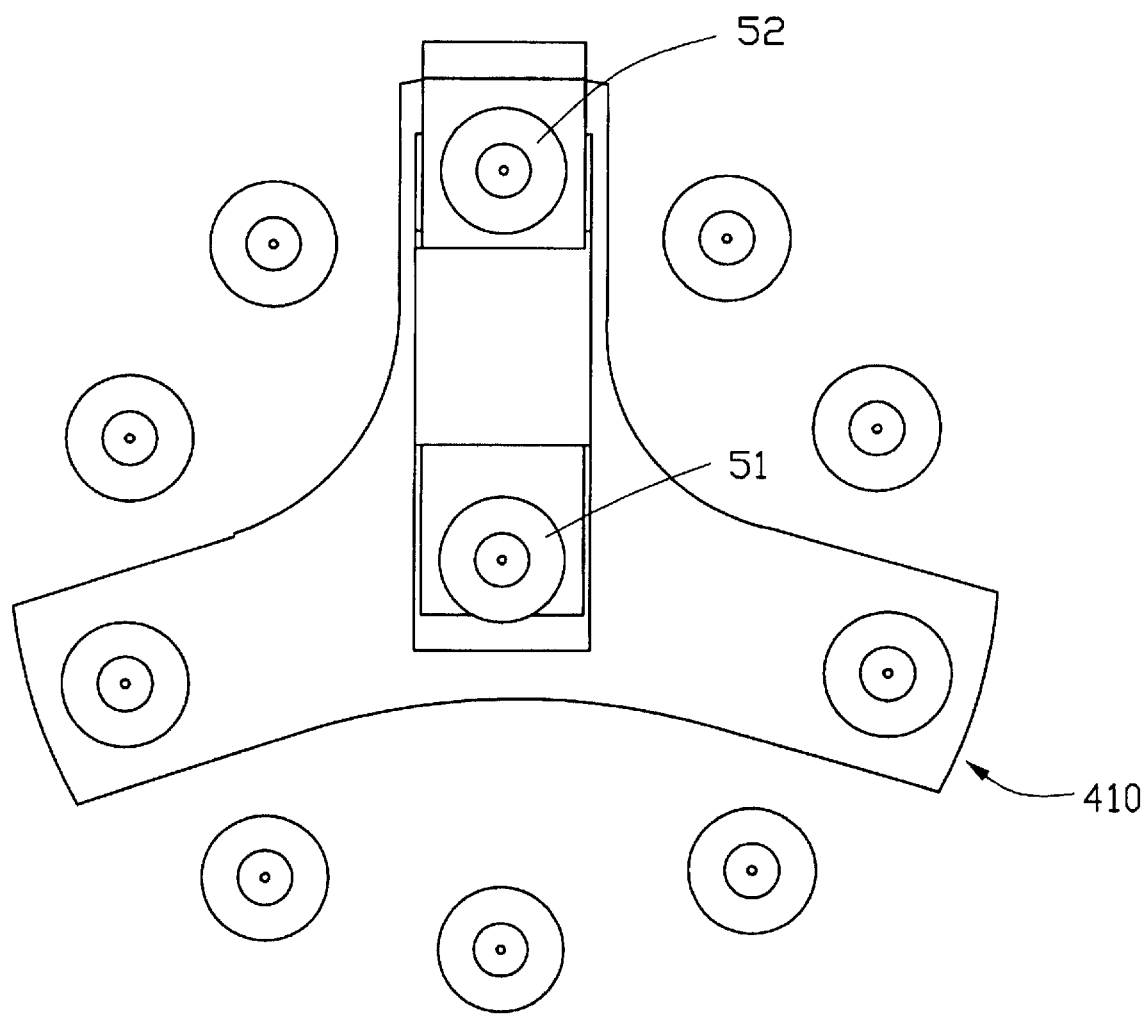
FIG. 6 is a schematic diagram of the optical switch, including an input port and a plurality of output ports.
Figure 7:
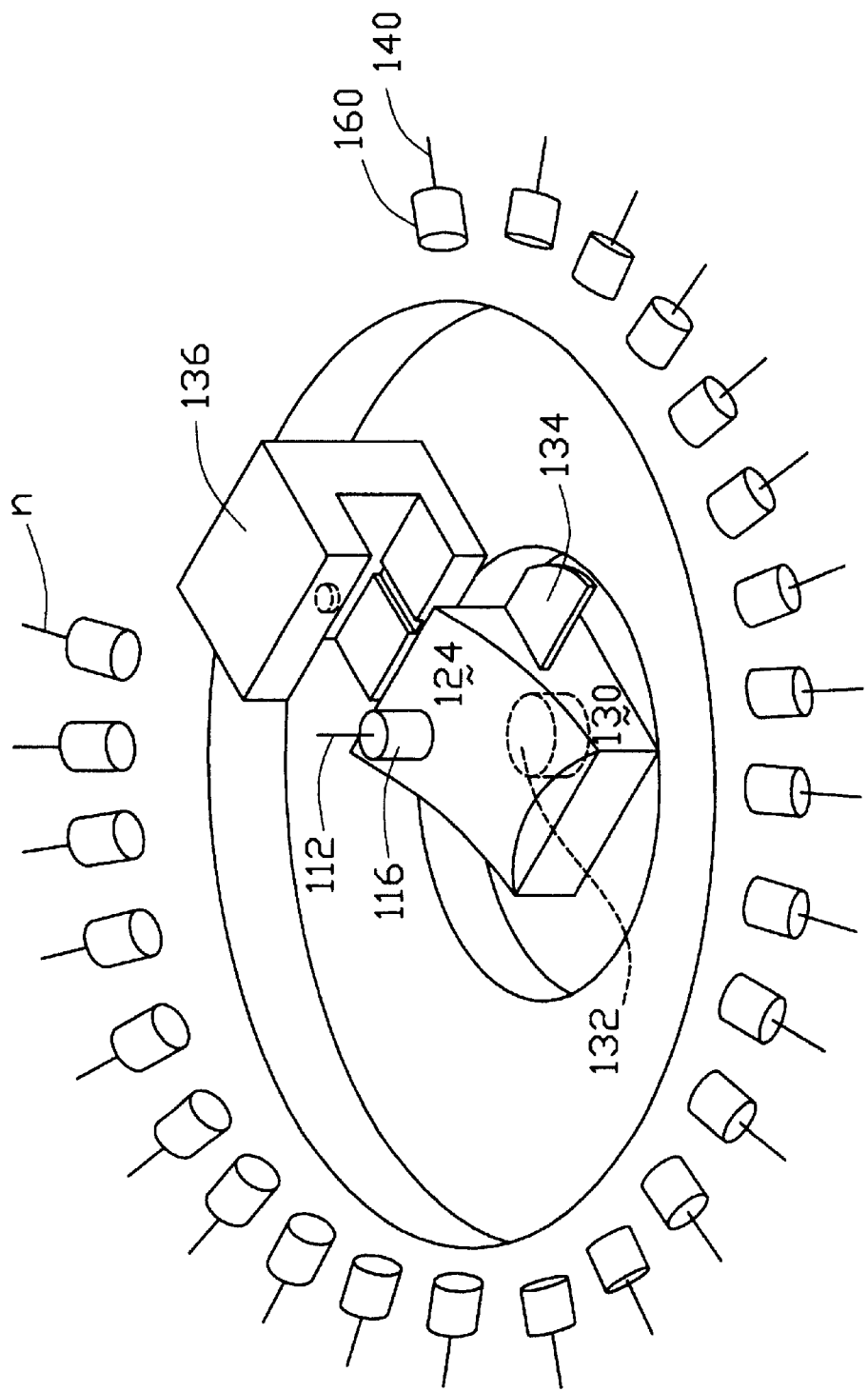
FIG. 7 is a perspective view of a prior art optical switch.
Figures 8, 9:
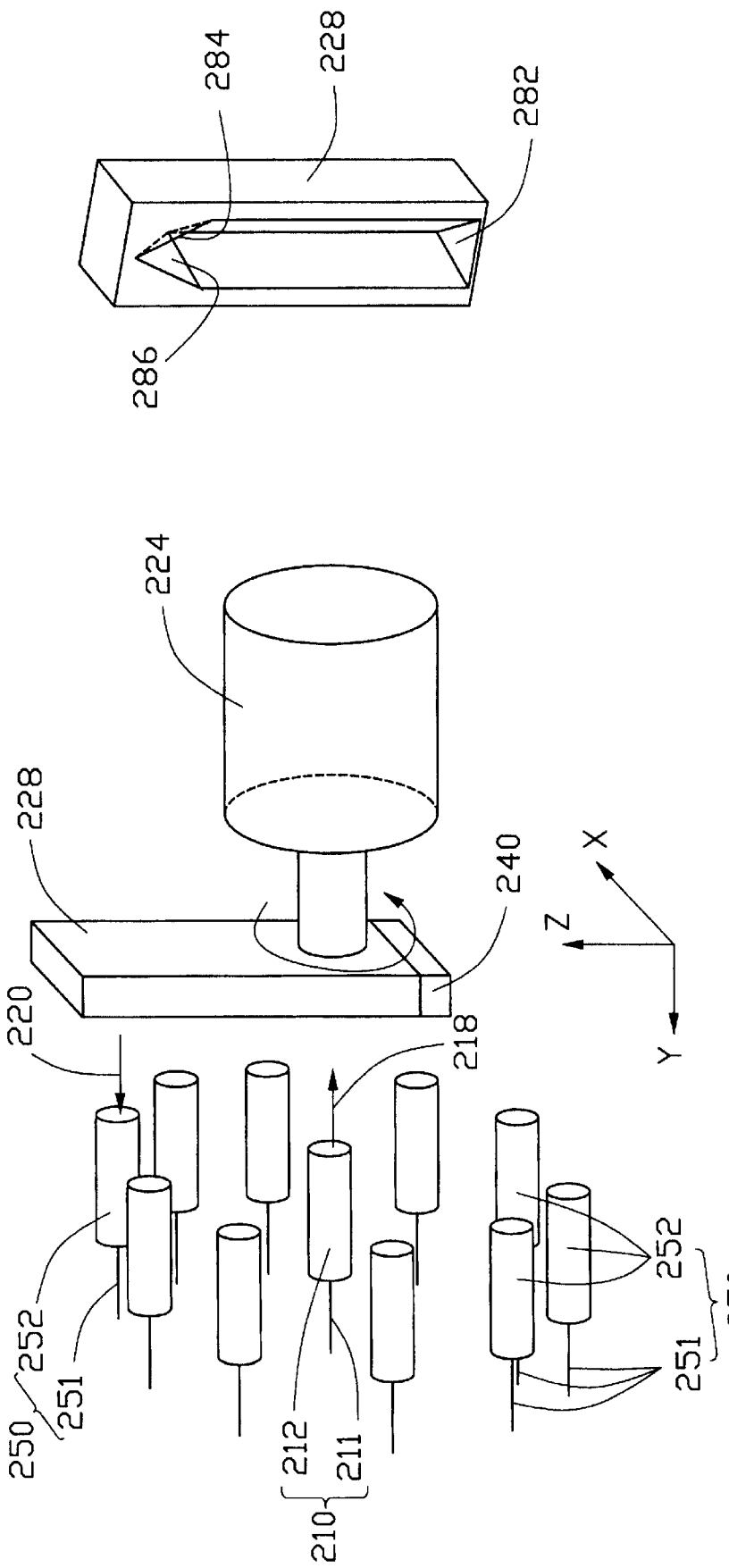
FIG. 8 is a schematic diagram of another prior art apparatus, including a mirror assembly, for switching signals from one fiber to another.
FIG. 9 is a perspective view of the mirror assembly of FIG. 8.

As shown in FIGS. 1, 2 and 5, an optical switch comprises an input port 51 having an input fiber 512 and a collimator 514, a plurality of output ports 52 having output fibers 522 and collimators 524, a switching element 40 for switching light signals from the input port 51 to any one of the output ports 52, and a base 30. The optical switch further comprises a cover 12, a housing 10, a plurality of boots 14 and a boot holder 16.

The base 30 comprises a first wall 300 and a second wall 350 opposed to one another. The second wall 350 defines a center hole 352 for mounting the input port 51 therein and a plurality of peripheral holes 354 for mounting the output ports 52 therein. The peripheral holes 354 are evenly positioned along a circumference of a circle, and the center of the circle coincides with the center hole 352. A groove 310 for receiving a motor 401 of a driving device 400 is defined on top of the first wall 300. The base 30 further defines a plurality of base screw holes 320.

Figure 3:
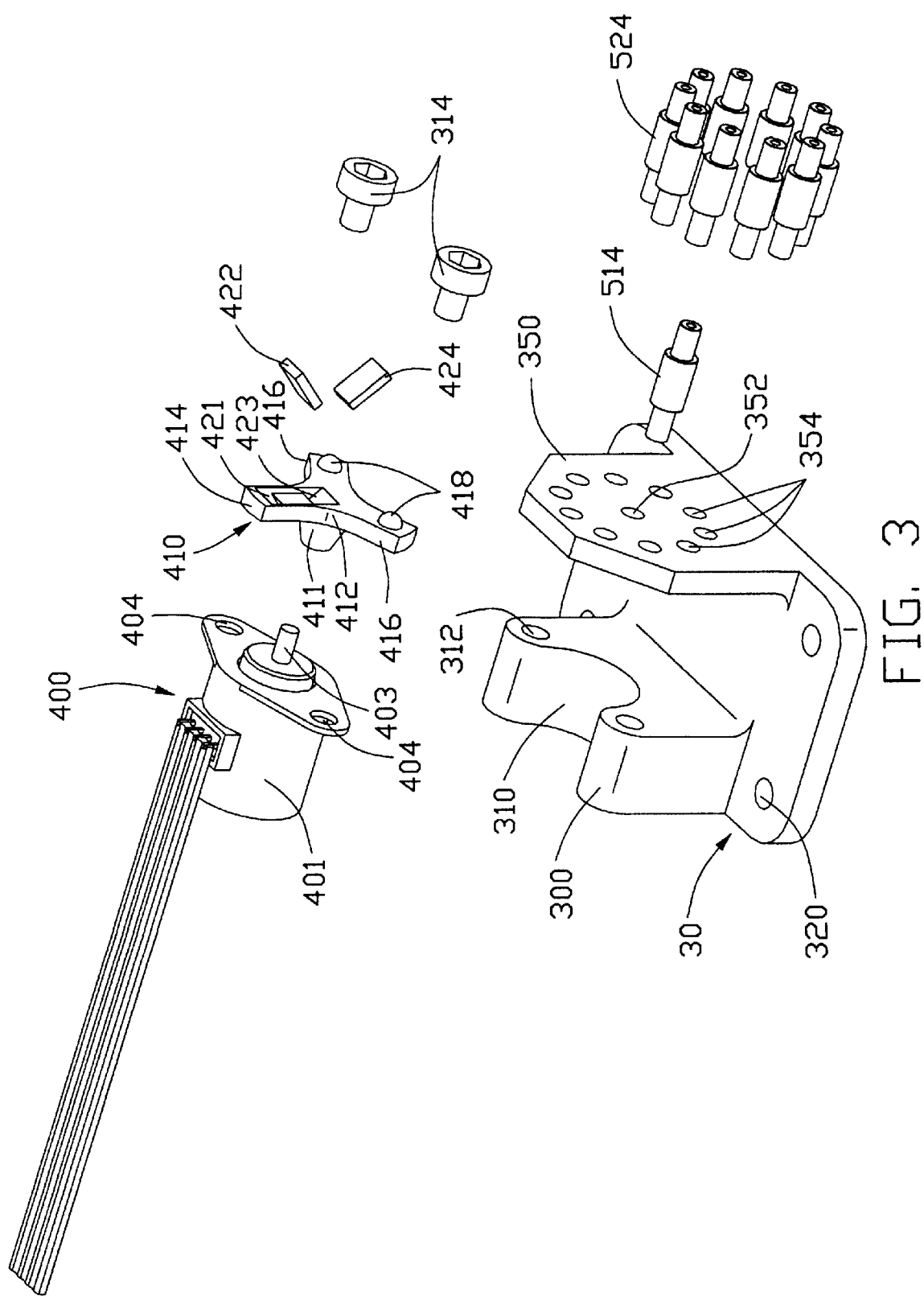
FIG. 3 an exploded view of the optical switch without a housing and the cover.
Figure 4:
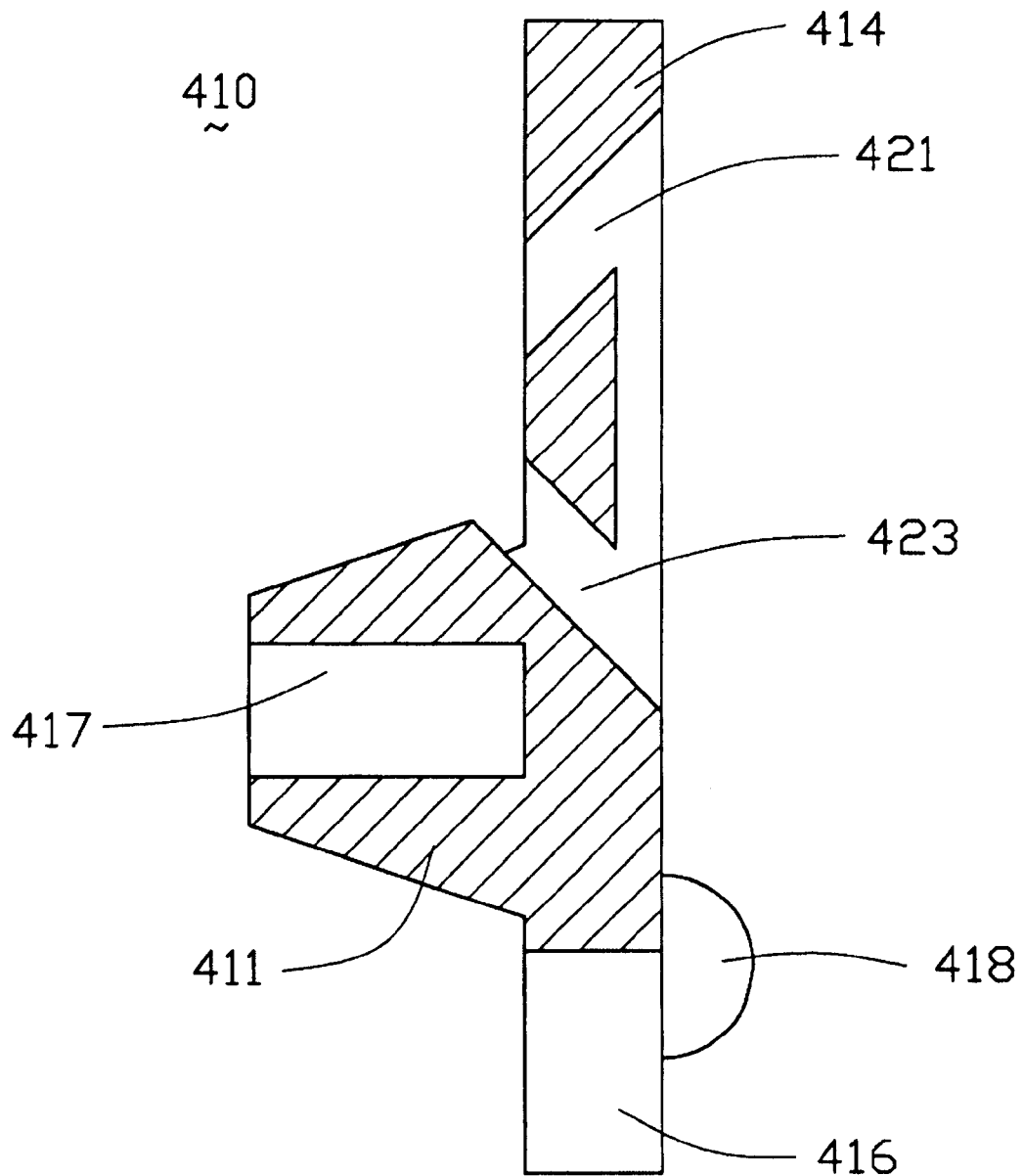
FIG. 4 is a cross-sectional view of a rotary holder of the optical switch.

Also referring to FIGS. 3 and 4, the switching element 40, in addition to the driving device 400, has a rotary holder 410 and two reflectors 422, 424 attached to the rotary holder 410. The driving device 400 has a rotating shaft 403 for connecting the rotary holder 410 with the motor 401. The motor 401 is a step motor. The rotary holder 410 includes a connecting portion 411 and a body 412 having a supporting arm 414 and two balancing arms 416 to which two counterweights 418 are attached, respectively. The positions of the counterweights on the balancing arms 416 can be adjusted to balance a combination of the rotary holder 410 and the two reflectors 422, 424.

The rotary holder 410 further defines a pair of slots 421, 423 in the supporting arm 414 for holding the two reflectors 422, 424 therein, respectively. Reflecting surfaces (not labeled) on the two reflectors 422, 424 are perpendicular to one another after the reflectors 422, 424 are assembled to the supporting arm 414. A hole 417 is defined in the middle of the connecting portion 411 of the rotary holder 410.

The housing 10 forms four sidewalls (not labeled) and a bottom wall 100 and defines an inner cavity (not labeled) therebetween. A plurality of screw holes 101 is defined in the bottom wall 100. A recess 103, a plurality of through holes 105 and two screw holes 108 are defined in one sidewall (not labeled) of the housing 10. The boot holder 16 defines two screw holes 168 and a plurality of holes 165 for receiving the boots 14.

FIG. 5 shows an essential optical paths diagram of the optical switch, wherein, the light signals coming from the input fiber 512 transmit through the collimator 514, are reflected by the reflector 424 and the reflector 422, are transmitted through the collimator 524 and are output through the output fiber 522. The light signals from the input port 51 can be output to any one of the output ports 52 by rotating the rotary holder 410 driven by the driving device 400.

In assembly, the reflectors 422, 424 are received in the two slots 421, 423 of the rotary holder 410, respectively, and the rotary holder 410 is attached to the driving device 400 by engaging the hole 417 of the connecting portion 411 of the rotary holder 410 with the rotating shaft 403 of the driving device 400. The switching element 40 is mounted on the first wall 300 by coupling screws 314 with flange screws holes 404 and mounting screw holes 312, the motor 401 being received in the groove 310 of the first wall 300. The collimator 514 of the input port 51 is mounted in the center hole 352 of the second wall 350, and the collimators 524 are mounted in the peripheral holes 354 of the second wall 350. The input fiber 512 is inserted through one of the holes 165 of the boot holder 16, through one of the boots 14, and through one of the through holes 105 of the housing 10, and is assembled in alignment with the collimator 514. The output fibers 522 are likewise inserted through corresponding holes 165, boots 14, and through holes 105 and are assembled in alignment with corresponding collimators 524, respectively. The base 30 is mounted in the inner cavity of the housing 10 by engaging screws 321 with the base screw holes 320 of the base 30 and the screw holes 101 of the housing 10. The reflecting surface of the reflector 424 is aligned with the collimator 514, thereby making the reflecting surface of the reflector 422 align with the circumference of the circle along which the output port collimators 524 are located. The boot holder 16 is fixed in the recess 103 of the housing 10 by engaging screws 18 with the screw holes 168 of the boot holder 16 and the screw holes 108 of the housing 10, with the holes 165 aligning with the corresponding through holes 105 of the housing 10. The cover 12 covers a top of the housing 10.

In use, the motor 401 of the driving device 400 drives the rotary holder 410 to rotate around a center axis of the connecting portion 411 via the rotating shaft 403. The rotary holder 410 is easy to balance about its center axis of rotation by adjusting the positions of the counterweights 418 on the two balancing arms 416 after the reflectors 422, 424 are received in the rotary holder 410. Moreover, the reflectors 422, 424 are easily replaced with different mirrors because the positions of the counterweights 418 on the two balancing arms 416 can be adjusted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical switch for switching signals between one input fiber and a plurality of output fiber comprising:
    a base having a first wall and a second wall, the second wall defining a center hole and a plurality of peripheral holes positioned evenly on a circumference of a circle centered on the center hole, the first and second walls being opposed to one another;
    an input port having a collimator mounted in the center hole of the second wall, the input fiber being aligned with the collimator;
    a plurality of the output ports each having a collimator mounted in the plurality of peripheral holes, one output fiber being aligned with each output port collimator; and
    a switching element mounted on the first wall of the base and comprising a rotary holder holding reflectors for reflecting signals from the input port to any one of the output ports by rotating the rotary holder.

2. The optical switch as claimed in claim 1, wherein the rotary holder comprises a connecting portion, a supporting arm and two balancing arms, with a counterweight being attached to each of the two balancing arms.

3. The optical switch as claimed in claim 2, wherein the rotary holder is balanced to evenly rotate around a center axis of the connecting portion of the rotary holder by adjusting positions of the two counterweights on the two balancing arms.

4. The optical switch as claimed in claim 2, wherein the rotary holder comprises two reflectors each having a reflecting surface, the two reflectors being mounted in two slots defined in the supporting arm of the rotary holder.

5. The optical switch as claimed in claim 4, wherein the reflecting surface of one reflector is aligned with the input port, and the reflecting surface of the other reflector is aligned with the circumference of the circle along which the output ports are positioned.

6. The optical switch as claimed in claim 5, wherein the connecting portion defines a hole for receiving a rotating shaft of a driving device.

7. The optical switch as claimed in claim 6, further comprising a housing defining an inner cavity for receiving the base and switching element therein, and a cover.

8. An optical switch for switching signals between one input fiber and a plurality of output fibers comprising:
    an input port having a collimator, the input fiber being aligned with the collimator;
    a plurality of output ports each having a collimator, one output fiber being aligned with each output port collimator; and
    a switching element for switching signals from the input port to any one of the plurality of output ports, comprising a rotary holder having a connecting portion and a body to which at least one counterweight is attached;
    wherein, the switching element rotates around a central axis of the connection portion of the rotary holder, and rotational balance of the rotary holder is achieved by adjusting positions of the at least one counterweight on the body.

9. The optical switch as claimed in claim 8, wherein the body comprises a supporting arm and two balancing arms and a counterweight is attached to each balancing arm.

10. The optical switch as claimed in claim 9, wherein the switching element further comprises two reflectors each having a reflecting surface, the two reflectors being held by the rotary holder.

11. The optical switch as claimed in claim 10, wherein the body further defines a pair of grooves in the supporting arm for holding the two reflectors therein, respectively.

12. The optical switch as claimed in claim 11, wherein the output ports are parallel to the input port and are arranged along a circumference of a circle, a center of which is coincident with the input port, the reflecting surface of one reflector is aligned with the input port, and the reflecting surface of the other reflector is aligned with the circle along which the output ports are located.

13. The optical switch as claimed in claim 12, wherein the connection portion defines a hole for receiving a rotating shaft of a driving device.

14. An optical switch for switching signals between one input fiber and a plurality of output fibers comprising:
    a base having opposing first second walls, the second wall defining a center hole and a plurality of peripheral holes positioned evenly on a circumference of a circle centered on the center hole;
    an input port having an input collimator mounted in the center hole of the second wall, the input fiber being aligned with the input collimator;
    a plurality of the output ports each having an output collimator mounted in the corresponding peripheral hole, one output fiber being aligned with each output port collimator; and
    a switching element mounted on the first wall of the base with moveable first and second reflectors wherein the first reflector is aligned with the input port and the second reflector is aligned with a selected one of the output ports.

* * * * *